W. F. BERGHOFER.
FEEDER.
APPLICATION FILED JULY 29, 1912.
1,120,178.
Patented Dec. 8, 1914.
2 SHEETS—SHEET 1.
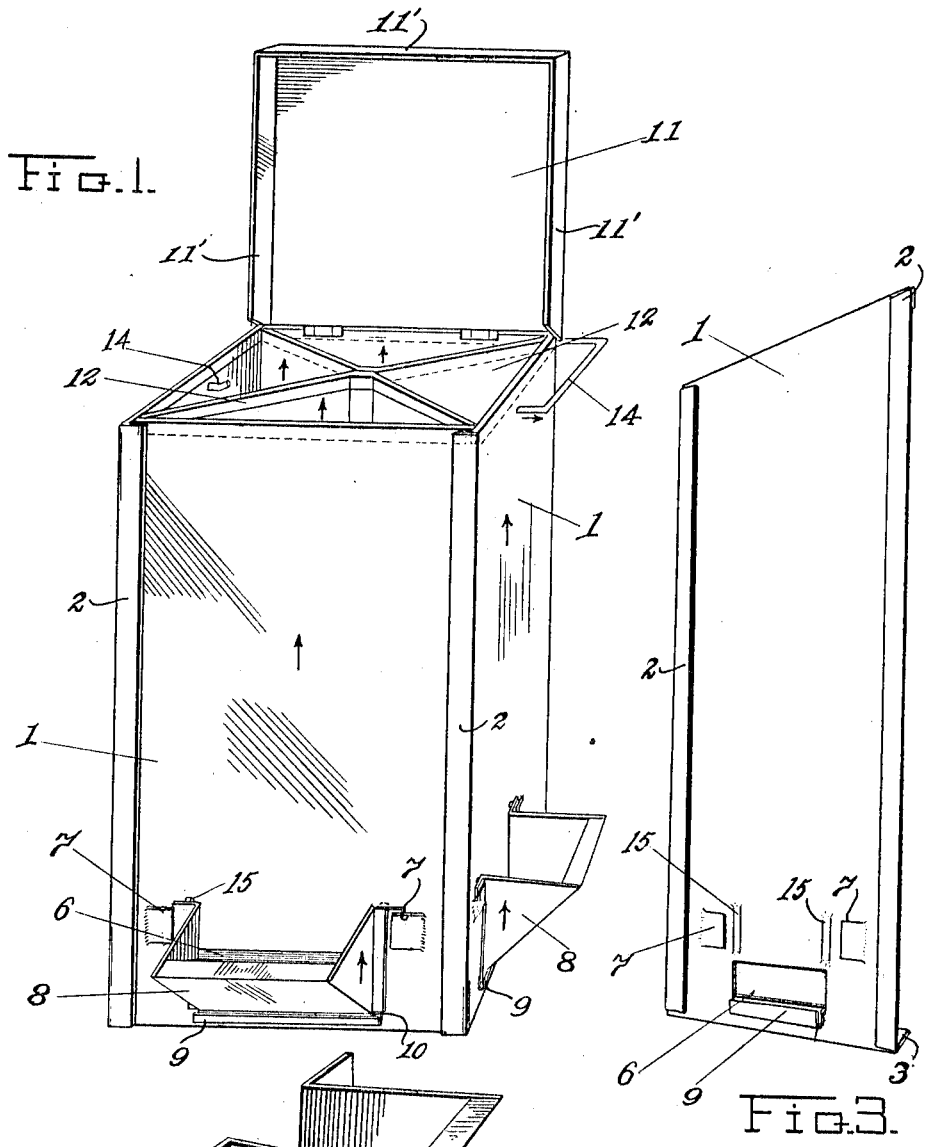
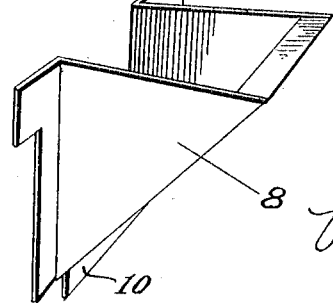
Witnesses
A. B. Doyle
H. F. Connor
Inventor
William F. Berghofer.
By Joel N. Morris
Attorney W. F. BERGHOFER.
FEEDER.
APPLICATION FILED JULY 29, 1912.
1,120,178.
Patented Dec. 8, 1914.
2 SHEETS—SHEET 2.
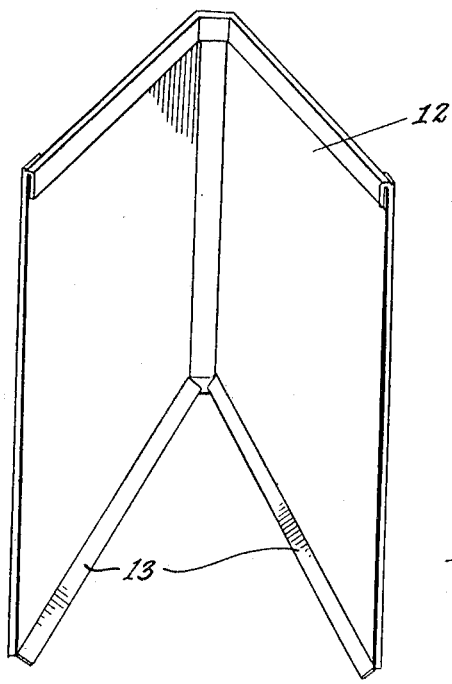
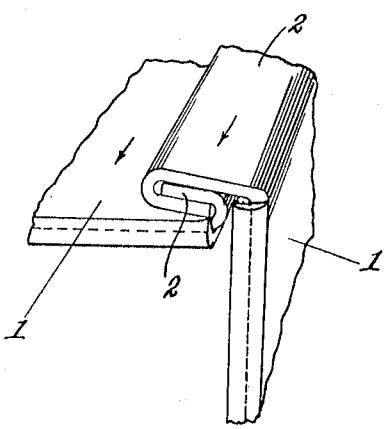
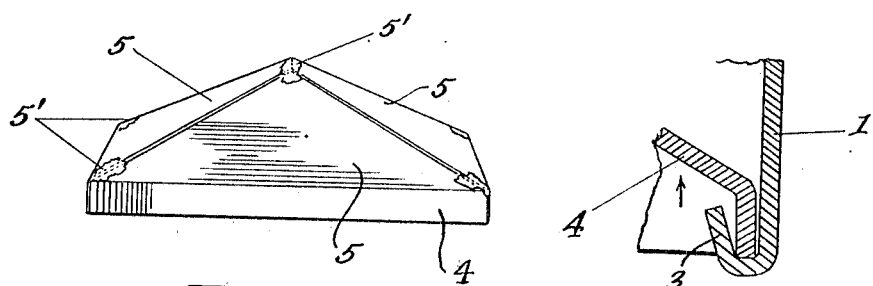
Witnesses
A. B. Doyle.
Inventor
William F. Berghofer
By Joel N. Morris
Attorney

UNITED STATES PATENT OFFICE.

WILLIAM F. BERGHOFER, OF QUINCY, ILLINOIS.

FEEDER.

1,120,178.  Specification of Letters Patent.  Patented Dec. 8, 1914.

Application filed July 29, 1912. Serial No. 712,092.

*To all whom it may concern:*

Be it known that I, WILLIAM F. BERG-HOFER, a citizen of the United States, residing at Quincy, in the county of Adams and State of Illinois, have invented new and useful Improvements in Feeders, of which the following is a specification.

This invention relates to poultry feeding apparatus and has for its object to provide a poultry feeder which will be of the so called knock-down type, constructed in such a manner that the various members thereof may be readily detached from each other when the feeder is to be stored or shipped, and may be subsequently re-assembled and attached without the use of pins, rings or similar fastening devices.

Another object is to have the construction of the feeder such that it can be readily made out of thin sheet metal and be at the same time relatively strong.

A further object is to eliminate the use of separate locking means for keeping the parts of the feeder rigidly together when properly assembled, but to have provision made for the purpose by arranging the parts so they will interlock with one another.

A still further object is to provide a feeder in which all of the parts may be readily and quickly detached from one another and cleansed, thus affording a device which is sanitary in all respects.

Other objects of this invention will become apparent as it is more fully set forth.

In the accompanying drawings, Figure 1, represents a view in perspective of a feeder embodying this invention. Fig. 2 is a detail in perspective of a member which forms a feeding trough used in the device. Fig. 3, is a detail in perspective, of a member forming one of the sides of the feeder. Fig. 4, is a detail of a compartment member. Fig. 5, is a detail, showing the manner of interlocking the pieces together and of reinforcing the upper edges of the same. Fig. 6, is a detail of the member forming the bottom of the feeder, and, Fig. 7, is a sectional detail showing the manner in which the bottom member and side pieces are interlocked.

Similar reference characters refer to similar parts throughout the drawings.

In the construction shown, the feeder is formed of sheet metal side members 1, having their vertical edges 2, bent so as to lock and catch on one another in the manner indicated. The bottom edges 3, are upwardly and inwardly turned in relation to the sides, so as to retain in place a pyramidically shaped bottom member 4. The member 4, is preferably constructed as shown, consisting of four interlocking parts 5, having solder 5' applied at suitable points to keep them together and free from leakage. The upper edges of the side members 1 are bent back on themselves to stiffen and strengthen the same.

In order to provide means for the egress of the feeding material from the feeder, an opening 6 is provided in each of the side members 1 adjacent the bottom thereof, and tongues 7, are arranged on both sides of the opening for the purpose of enabling feeder-troughs 8, to be removably attached to the sides of the feeder. A channeled member 9, formed from a portion of the material removed to provide the opening 6, is arranged to support the bottom piece 10 of each trough, as is clearly shown in the drawings.

The troughs are of the form shown, each being made out of a single piece of material bent in the manner indicated and arranged to be readily detached from the feeder. A cover 11, is removably hinged to one of the side pieces and provides a suitable protective closure for the feeder. The edge portions 11' of the cover are bent so as to catch on the sides of the feeder in the manner clearly apparent from the drawings, to form a more perfect closure.

In order to provide suitable compartments in the feeder, two quasi-V-shaped members 12 are disposed within the feeder with their apexes arranged one against another, in an inverted relation, as shown in Fig. 1. The lower edge portions 13, of said members are cut and angularly bent to readily coöperate with the member 4.

A handle 14 is suitably pivoted in the upper portions of two of the side members 1 and can be easily removed therefrom on being properly manipulated. The various edges of the parts of the feeder are reinforced by bending the material back on itself whenever desirable, as can be noted in the drawings, and suitable bosses 15, are provided adjacent the tongues 7 in order to provide means for resiliently retaining the troughs in place.

In order to demonstrate the manner of detaching the parts of the feeder from one another, plain arrows are indicated on the parts in the drawings to show the direction in which they are moved when the disassembling is to be done, which is so apparent that no further detailed description appears necessary to explain it.

It will be noted that while the construction of the device is comparatively simple and light, yet it is designed to withstand the usage for which it is intended, and that when completely knocked down it takes up but comparatively small space, thereby enabling quantities of these feeders to be shipped or stored conveniently and with greater safety than is possible with the usual type of feeder.

Having thus described the invention I claim:—

1. A knock-down feeder comprising, a casing having a plurality of side walls and a bottom, means on the vertical edges of said walls whereby they are interlocked one with another, pairs of oppositely disposed tongues cut in the side walls and bosses provided adjacent and between the tongues, and one-piece feeding troughs having edge portions bent so as to engage under the tongues and be resiliently pressed against the same by the bosses as described.

2. In a device of the class described the combination of flexible side-pieces having pairs of oppositely disposed tongues cut therein and bosses provided adjacent and between the tongues, and one-piece feeding troughs having edge portions bent so as to engage under the tongues and be resiliently pressed against the same by the bosses as described.

WILLIAM F. BERGHOFER.

Witnesses:
EDWARD H. MITCHELL,
H. J. ELMER BERGHOFER.

Copies of this patent may be obtained for five cents each, by addressing the "Commissioner of Patents, Washington, D. C."